United States Patent [19]
Pasco

[11] Patent Number: 5,187,360
[45] Date of Patent: Feb. 16, 1993

[54] ASPHERIC LENS HAVING A PLURALITY OF LENSLETS DISPOSED SUBSTANTIALLY CONTIGUOUSLY IN AN ARRAY

[75] Inventor: Ian K. Pasco, Bracknell, England

[73] Assignee: Combined Optical Industries Limited, Slough, England

[21] Appl. No.: 633,367

[22] Filed: Dec. 31, 1990

[30] Foreign Application Priority Data

Nov. 30, 1990 [GB] United Kingdom ................ 9026069

[51] Int. Cl.⁵ .............................................. H01J 40/14
[52] U.S. Cl. ................................ 250/208.2; 250/216; 359/20
[58] Field of Search ................. 250/208.2, 221, 222.1, 250/216; 340/567; 359/20

[56] References Cited

U.S. PATENT DOCUMENTS

| | | | |
|---|---|---|---|
| 3,958,118 | 5/1976 | Schwarz | 340/567 |
| 4,516,832 | 5/1985 | Jain et al. | 359/20 |
| 4,717,821 | 1/1988 | Messiou | 250/221 |
| 4,876,445 | 10/1989 | McMaster | 250/221 |
| 4,930,864 | 6/1990 | Kuster et al. | 250/221 |

Primary Examiner—David C. Nelms
Assistant Examiner—Que T. Le
Attorney, Agent, or Firm—Oblon, Spivak, McClelland, Maier & Neustadt

[57] ABSTRACT

The lens includes a plurality of lenslets arranged substantially contiguously in an array. Each lenslet is adapted to receive radiation from a particular zone not substantially overlapping with adjacent zones, and to focus said radiation to a predetermined common point. A detector may be located adjacent said common point and preferably includes at least two detector elements each to detect infra red radiation from a different zone.

7 Claims, 7 Drawing Sheets

ASPHERIC LENS HAVING A PLURALITY OF LENSLETS DISPOSED SUBSTANTIALLY CONTIGUOUSLY IN AN ARRAY

The present invention relates to a multiple array lens. More particularly, it relates to a lens comprising an array of lenslets, each adapted to focus radiation from a respective zone to the focus of the lens. The term lenslet is used herein for convenience to define a small lens forming part of the overall array of the lens of the invention.

It is well known that lenses are most accurate near their centre and errors start to occur as the outer edge of the lens is reached. This can often be corrected to a greater or lesser degree by forming the lens as an aspheric curve, possibly based on a conic section with correction coeffecients. However, it is difficult to provide a lens which gives error free focusing of radiation received from a wide area. Such lenses are required for intruder detectors, which term is used herein to include not only intruder detectors, but security sensors, heat detectors, environmental (heating and lighting) detectors and general motion detectors. All of these require a wide field of view.

It is often a further requirement for intruder detectors that they be small and inconspicuous and to achieve this, it is often necessary to use a thin lens. This can generally only be accomplished by using a fresnel lens.

It is an object of the present invention to provide a lens which is suitable for intruder detectors and which overcomes the disadvantages outlined above. It is another object of the invention to provide an intruder detector utilising such a lens.

According to the present invention there is provided a lens comprising a plurality of lenslets arranged substantially contiguously in an array, each lenslet being adapted to receive radiation from a particular zone not substantially overlapping with adjacent zones, and to focus said radiation to a predetermined point.

Preferably each lenslet comprises a central portion of a lens, which may be a fresnel lens, an optimised aspheric lens, or any other magnifying lens.

The lens may be integrally moulded, preferably from high density polyethylene, or acrylic material.

In this case, the maximum thickness of the lens (at an optical axis of a lenslet) may be in the region of 0.5 mm and the minimum thickness (where two lenslets join) may be in the region of 0.25 mm.

Each lenslet may have a substantially hexagonal shape, which maybe regular or irregular. Other shapes can, of course, be used.

The lens may be generally planar or generally dome shaped.

According to a second aspect of the present invention there is provided an intruder detector comprising a lens as described above, adapted to receive infra red radiation, a detector for said radiation and having at least two detector elements located at or close to said predetermined point.

The detector may comprise a plurality of detector elements, each element receiving radiation from one or more predetermined lenslets. Calculator means may be provided to receive signals from said detector elements and thereby identify the size or direction of movement of a radiation source.

Embodiment of the present invention will now be more particularly described by way of example and with reference to the accompanying drawings, in which.

Figure 1:
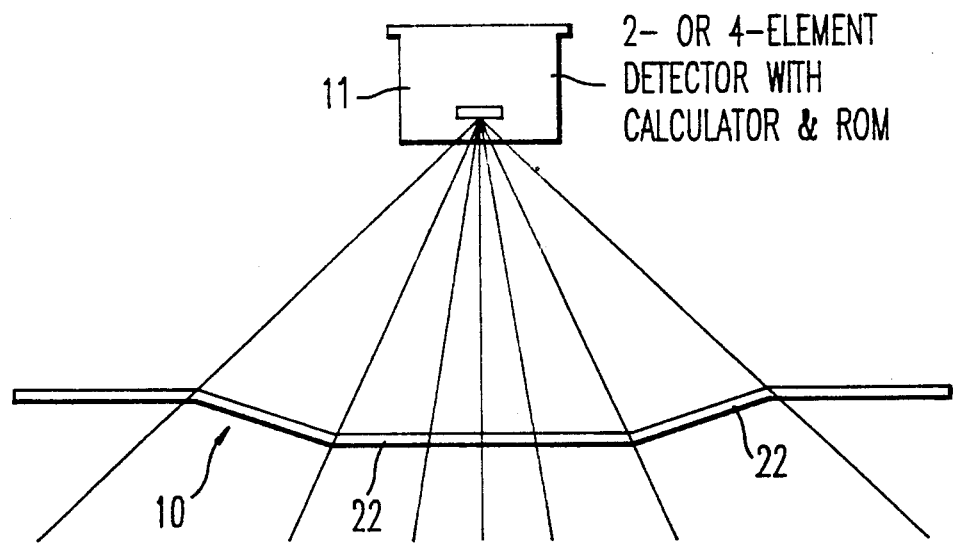
FIG. 1 is a schematic cross sectional view of a ceiling lens.
Figure 2:
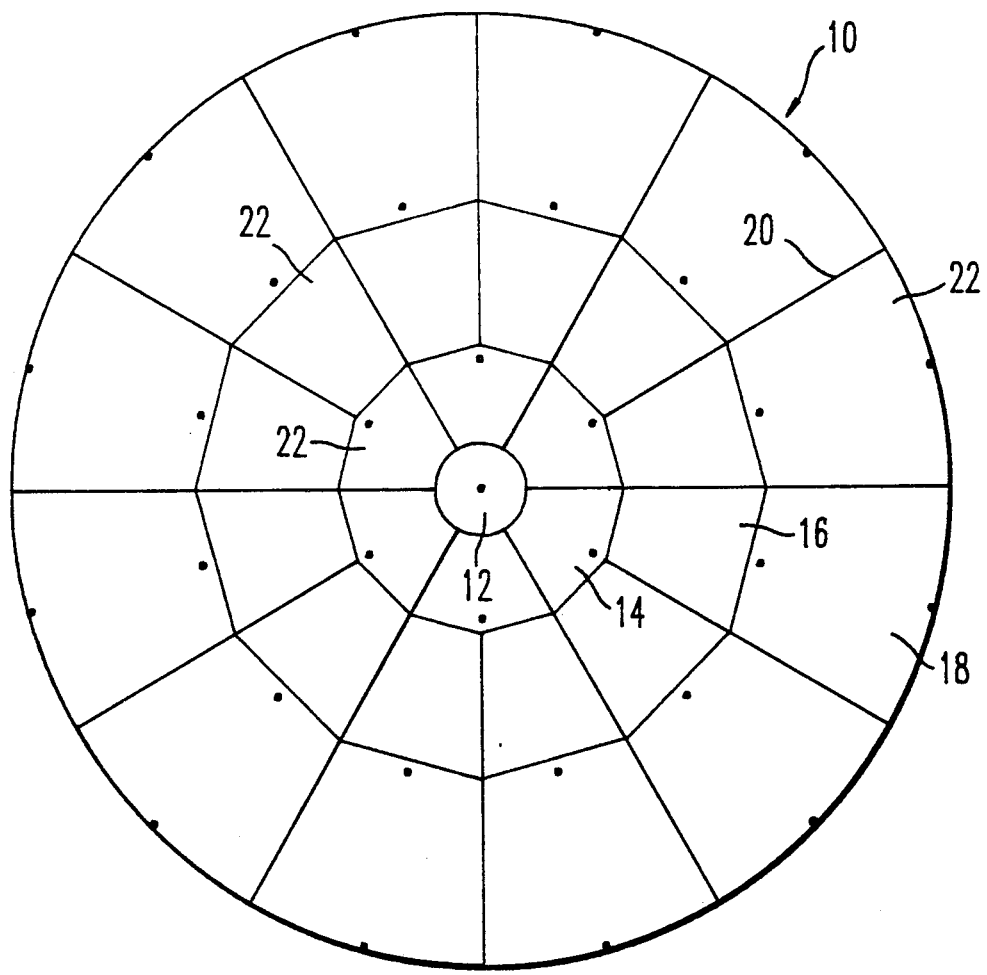
FIG. 2 is a plan view of the lens of FIG. 1.

Referring now to the drawings, FIGS. 1 and 2 show a ceiling lens 10 for two or four element detectors 11. The lens 10 is circular and composed of four concentric circles 12, 14, 16 and 18, the outer ones 14, 16, 18 of which are divided by a plurality of radially extending lines 20. The lens thus comprising 31 lenslets 22, the inner ones of which are formed by center of optimised aspheric lenses while the larger outer lenslets are formed by the centers of fresnel lenses. If so desired, fresnel lens centers could be used throughout.

As can be seen from FIG. 1, the lens 10 is slightly dished so that it may receive radiation from a wide area. Such a lens finds most use in a lighting system, although it may also be used for a security sensor. Using only the centers or near center areas of lenses enables the lens to provide fields of detection of greater density than hitherto.

Figure 4:
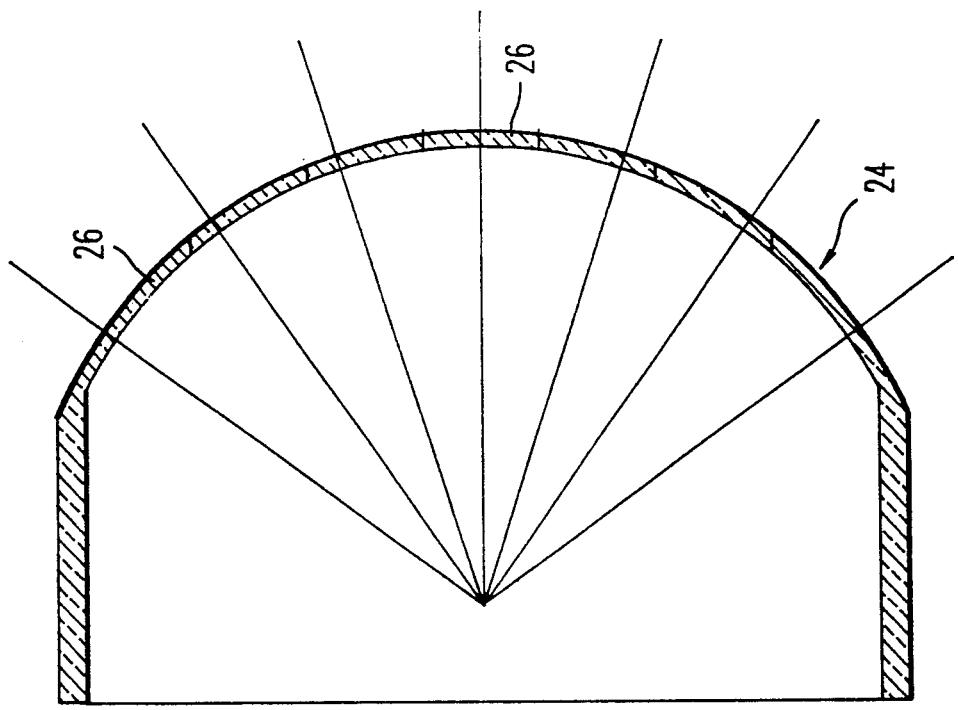
FIG. 4 is a schematic cross sectional taken substantially on the line 4—4 of FIG. 3; of FIG. 3.
Figure 3:
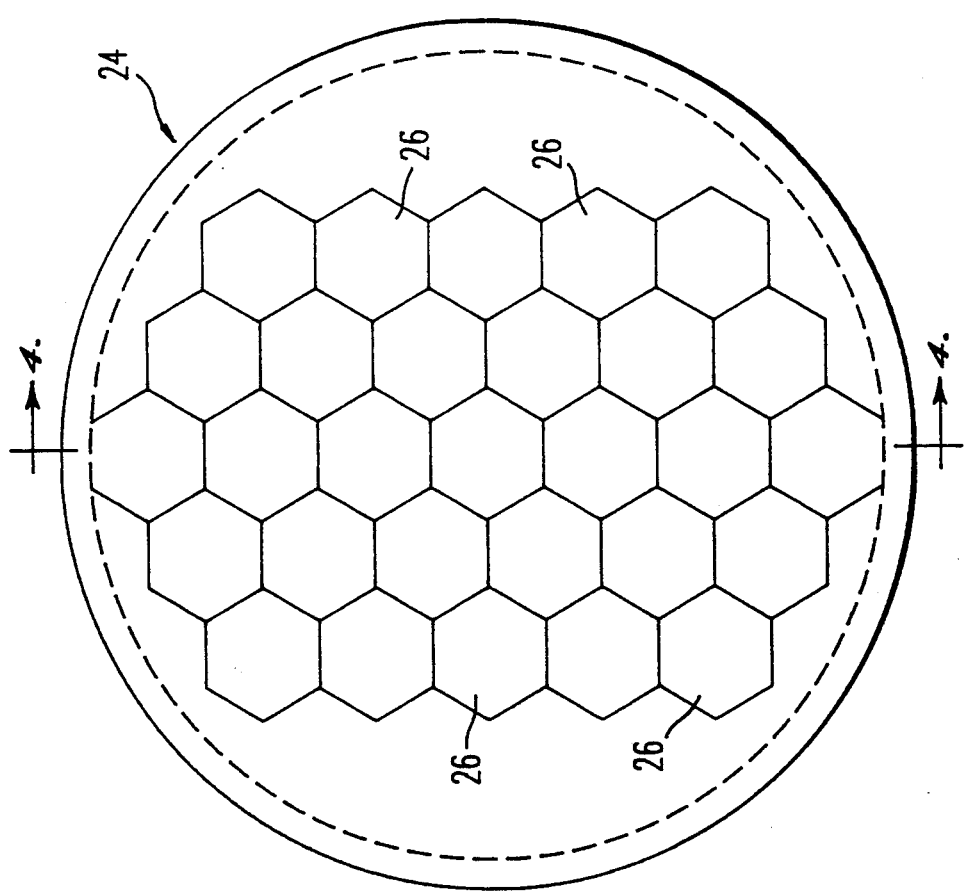
FIG. 3 is a plan view of a hemispherical dome lens having a plurality of hexagonal lenslets.

Referring now to FIG. 3 and 4, there is shown a hemispherical dome lens 24 having twenty nine lenslets 26 or detection zones. Additional lenslets could be provided. Each lenslet is hexagonal in shape and is the central portion of an optimized aspheric lens. Since only the central portion of the lens is used, it is generally only necessary to use up to five correction coefficients in order to optimize the focusing of the lens.

Figure 6:
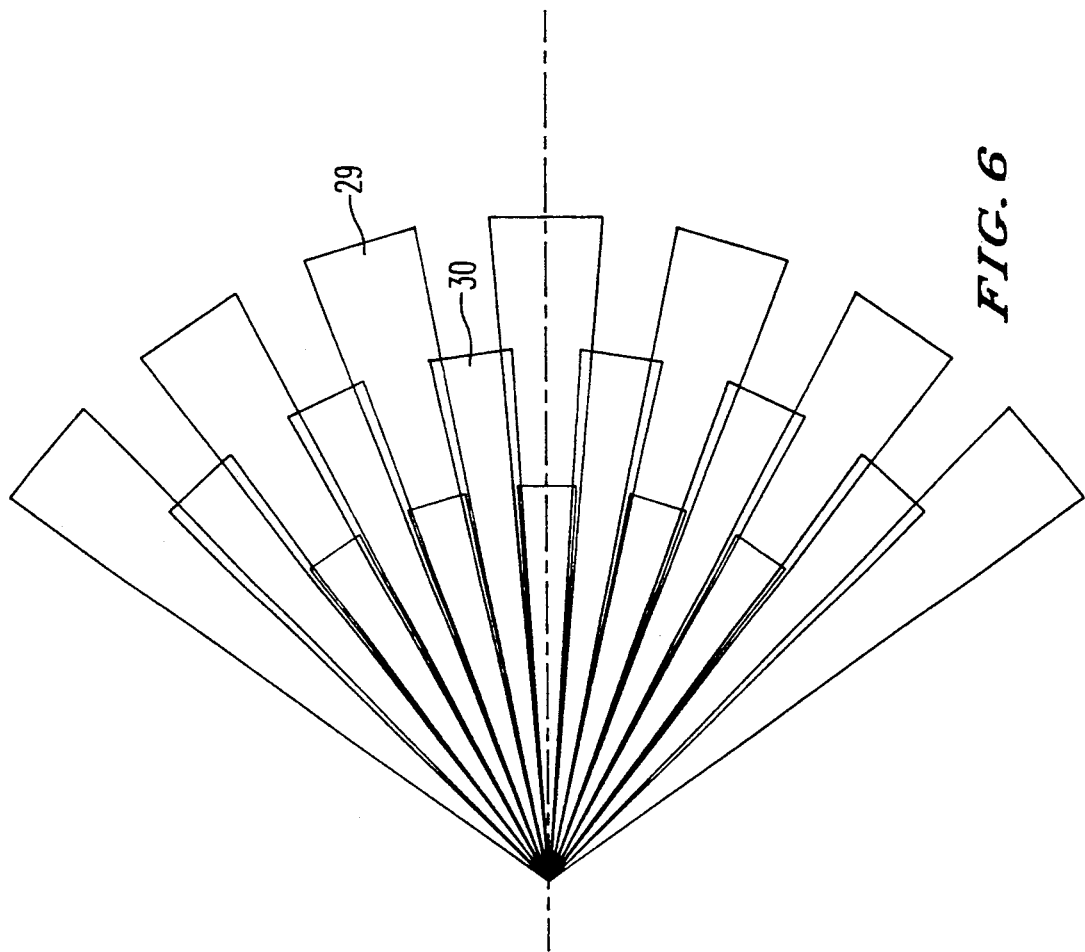
FIGS. 5 and 6 are schematic views showing in plan and elevation the areas of detection for each lenslet of the lens of FIGS. 3 and 4.
Figure 5:
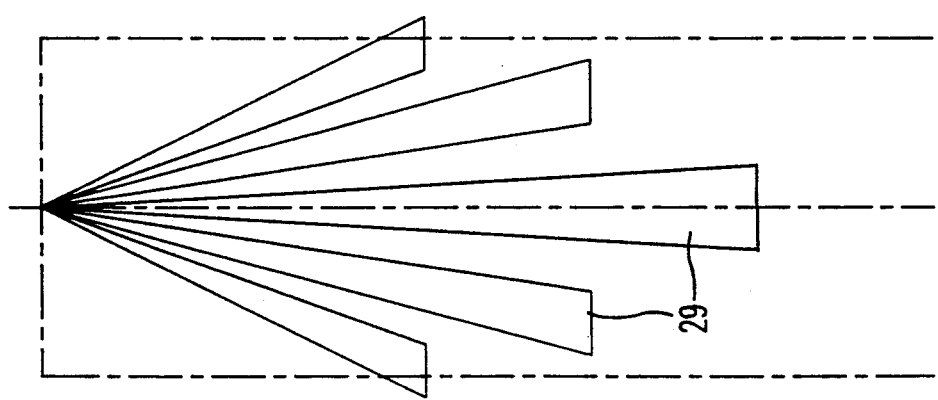

The entire lens of FIG. 3 is approximately 1 inch (2.54 cm) in diameter and with suitable gain electronics, would have a range up to about 10 metres with a 90° coverage. As can be seen in FIG. 3 no two lenslets in a horizontal row are contiguous to each other thus, as can be seen from FIGS. 5 and 6, each lenslet in a row receives light from a discrete zone 29 spaced closely to but not overlapping an adjacent zone. The hexagonal shape of the lenslets means that the array is such that one row will detect radiation emanating from a semicircular ring of zones, while the lenslets in the row above (and that below) are contiguous to those in the first row and will detect radiation at a different vertical level, such as 30 in FIG. 6, but otherwise overlapping the zones detected by the first mentioned row. Thus, a good range of coverage is provided.

Figures 7, 7A, 7B:
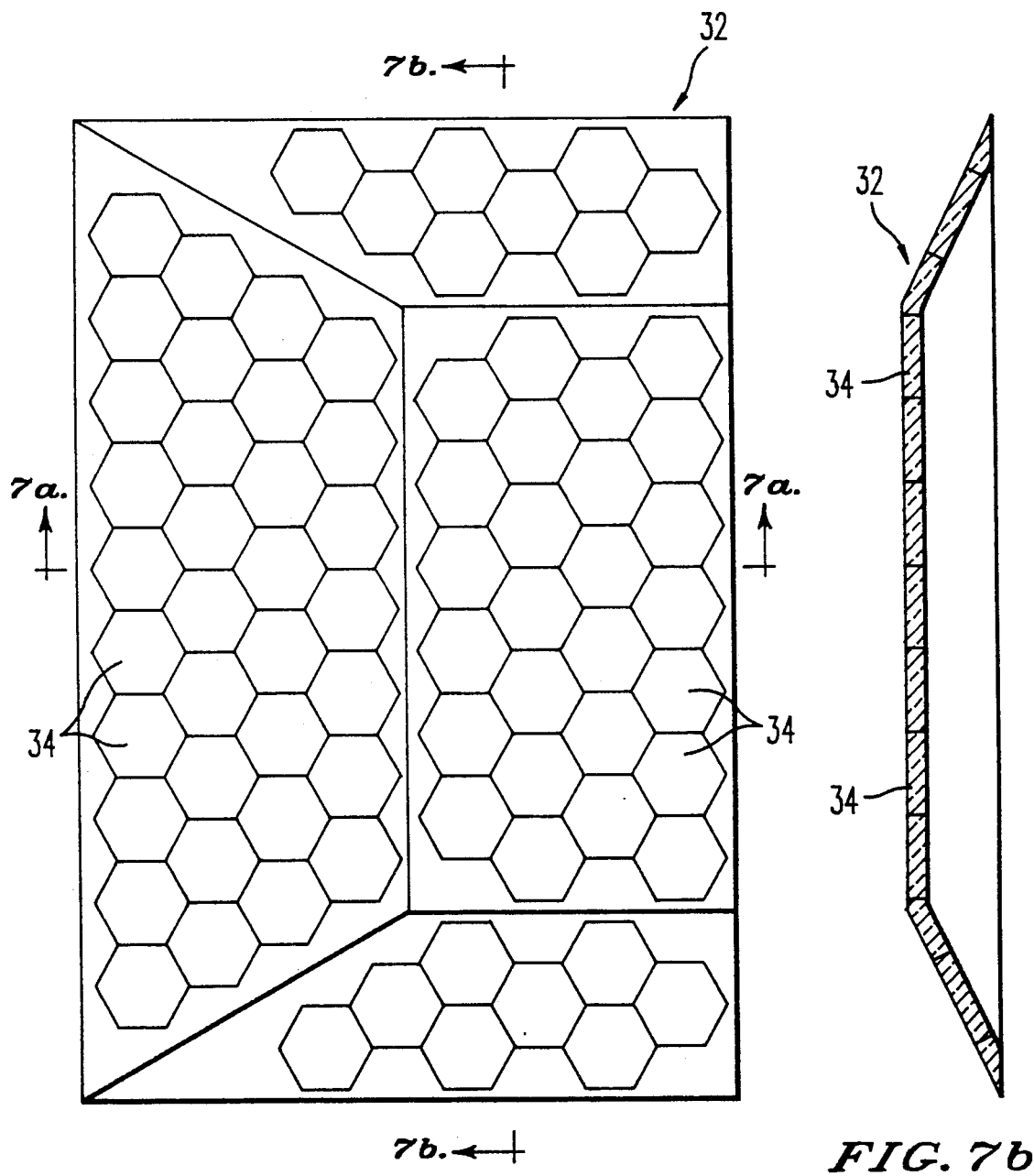
FIG. 7 shows a faceted pyramid lens.
FIG. 7a is a profile view taken substantially on the line 7a—7a of FIG. 7.
FIG. 7b is a profile view taken substantially on the line 7b—7b of FIG. 7.
Figure 8:
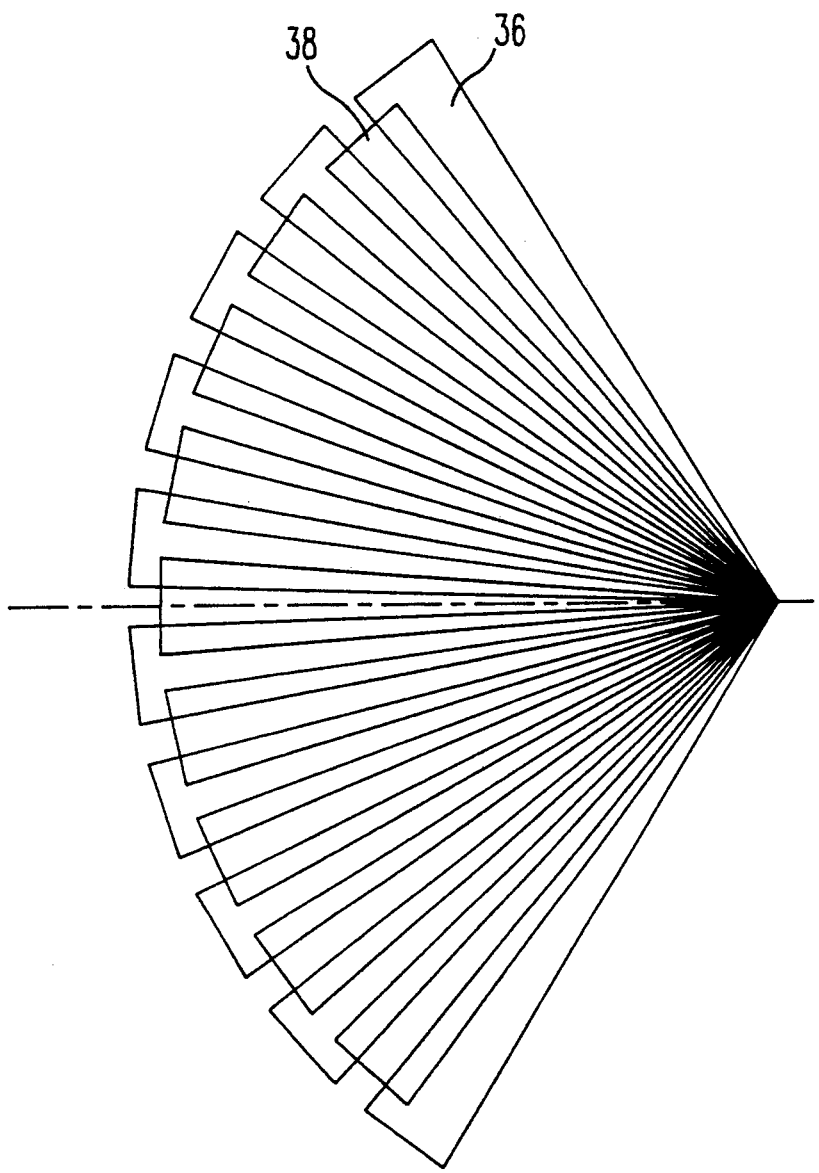
FIG. 8 shows a plan view of the zones of detection of the lens of FIG. 7.

Referring now to FIG. 7, there is shown a faceted pyramid lens 32, which is intended for incorporation into one half of a light switch. The other half of the switch plate is available for the switch itself. Again, the lens comprises several pluralities of hexagonal lenslets 34, each arranged in a planar array over a respective face of the faceted pyramid. The lenslets are central portions of optimised aspheric lenses. FIG. 8 shows schematically the detection zones 36, 38 for such a lens.

Figure 9:
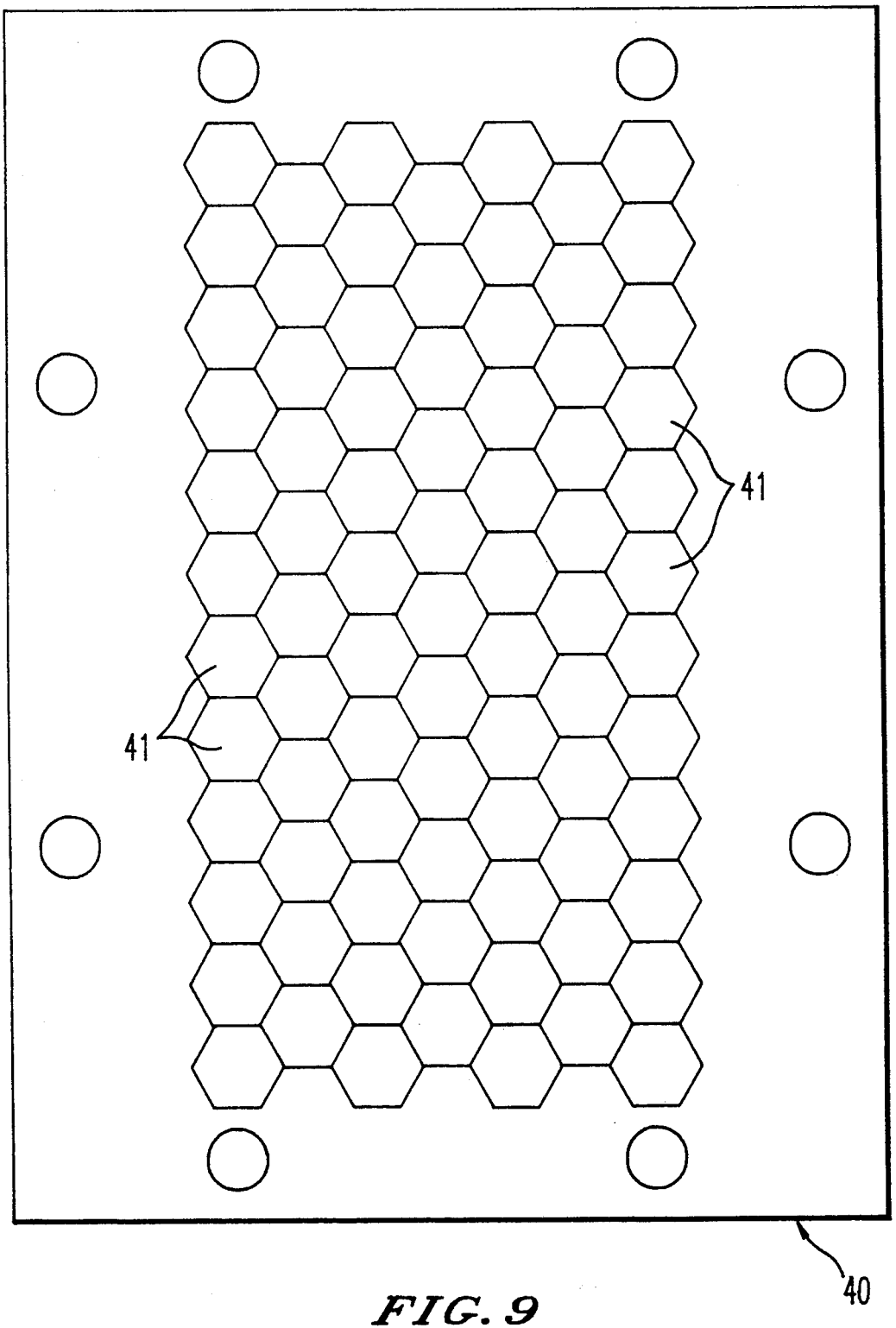
FIG. 9 is a plan view of a flat lens having a plurality of hexagonal lenslets.
Figure 11:
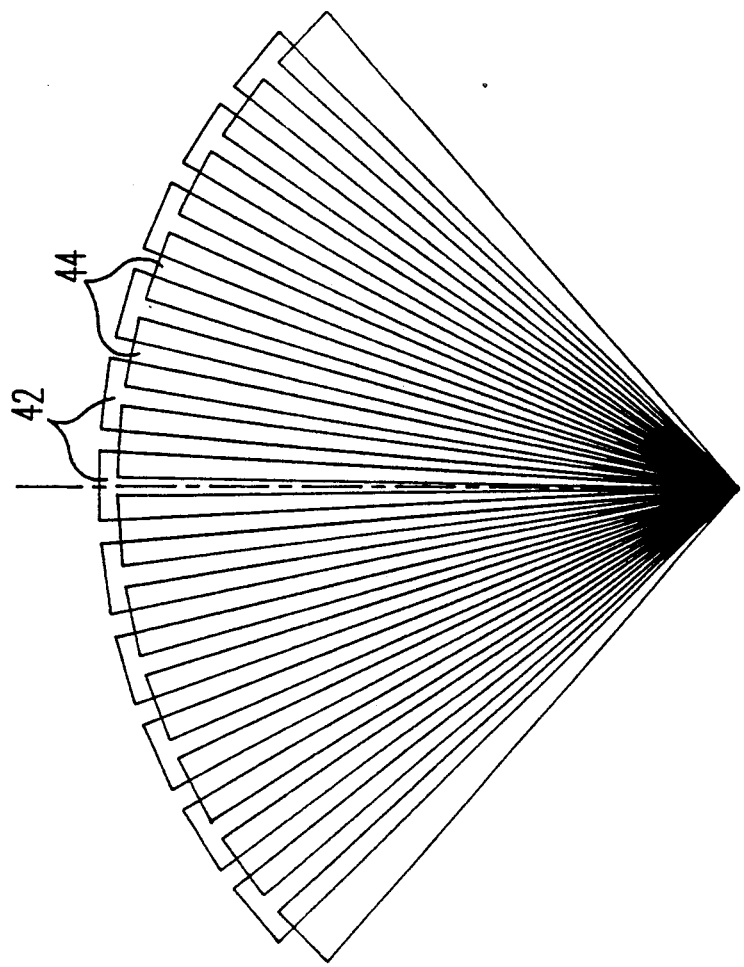
FIGS. 10 and 11 are respectively elevation and plan views of the zones of detection of the lens of FIG. 9.
Figure 10:
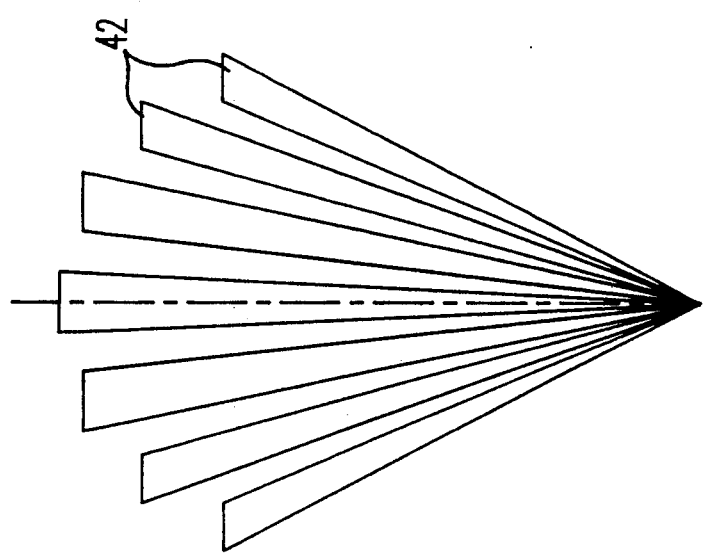

Finally, referring to FIGS. 9 to 11, there is shown a flat multiple array lens 40, again using hexagonal lenslets 41 each of which is a central portion of an optimised aspheric lens.

FIG. 10 shows the non-overlapping detection zones 42 for any row of lenslets and FIG. 11 shows the overlap of detection zones 44 of a row above or below the row of lenslets having the zones 42.

The lenses shown are integrally moulded from high density polyethylene. In order for the material to flow in the mould, the minimum thickness of the lens should be at least 0.25 mm and such a thickness may occur where the lenslets join one to another. Polyethylene does absorb infra-red radiation in the 7 to 14 um band and therefore, the maximum thickness of the lens is preferably no more than 0.5 mm. In order to maintain the thickness of the lens within these parameters, it has been found that hexagons are the optimum shape. However, triangles, rectangles or even pentagons may be used. In the dome lens, the shape is not a perfect regular hexagon since it is in fact formed by intersecting circles. However, it may be thought of as an irregular hexagon.

In a dome shaped lens, the outer surface is generally spherical with the inner surface formed as a plurality of aspheric surfaces, each defining a lenslit.

As stated above, the lens is intended for use with an intruder detector as hereinbefore defined. Detectors are known which have two or four pyroelectric detector elements and detectors with larger number of elements are feasible and under development. Alternatively, polyvinylidine fluoride (PVDF) film detectors are known. Any moving object emitting heat in the 7 to 14 um band will produce a rising voltage in the respective detector element. A preselected rate of rise can be used to generate a digital signal. This function is normally performed by an analog to digital converter. The signals can be fed to a calculating means which, in conjunction with a programmable read only memory all of which may be incorporated int the detector 11 of FIG. 1, can be used to track the pulses and therefore the radiation source. It will also be able to determine the size of the radiation source from the number of detectors which have been activated. The system can be programmed to give an alarm signal only when the radiation source is of above a predetermined size, and it will therefore not be activated by cats or other small animals, if that is desired. The system is also able to discriminate between person size radiation sources and vehicle sized radiation sources.

Furthermore, the speed of the radiation source across the field of view of the detector can be calculated and again, an alarm signal may only be sent when this speed falls within predetermined parameters. Alternatively, the time elapsed between start and stop of the pulse train may be used to determine the width of the intruder or, using the vertical lenslets, the height of the intruder.

One advantage of such a system is that higher gain electronics may be used without danger of false alarms. This is important for security systems. Furthermore, use of higher gain electronics enables greater range to be obtained from lenses of smaller size.

I claim:

1. A lens comprising a plurality of lenslets disposed substantially contiguously in an array, each lenslet being positioned to receive radiation from a particular zone not substantially overlapping with adjacent zones, and to focus said radiation to a predetermined common point, each lenslet comprising a central portion of a lens, said lens being an optimized aspheric lens.

2. A lens according to claim 1, which is integrally moulded from high density polyethylene.

3. A lens according to claim 2, wherein the maximum thickness of the lens (at an optical axis of a lenslet) is in the region of 0.5 mm and the minimum thickness (where two lenslets join) is in the region of 0.25 mm.

4. A lens according to claim 1, wherein each lenslet has a substantially hexagonal shape.

5. An intruder detector comprising a lens according to claim 1, and detector means for detecting infra red radiation said detecting means including at least two detector elements located adjacent said predetermined point.

6. An intruder detector according to claim 5, comprising a plurality of detector elements, each element receiving radiation from one or more predetermined lenslets.

7. An intruder detector according to claim 6, comprising calculator means to receive signals from said detector elements and thereby identify the size and direction of movement of a radiation source.

* * * * *